(No Model.)

B. F. LEVET.
HOSE COUPLING.

No. 437,213.

Patented Sept. 30, 1890.

Attest.
Victor J. Evans
M. A. Redmond

Inventor.
Benjamin F. Levet.
By W. A. Redmond
Atty.

UNITED STATES PATENT OFFICE.

BENJAMIN F. LEVET, OF SAN DIEGO, CALIFORNIA, ASSIGNOR OF ONE-HALF TO FRANCIS W. STEWART, OF SAME PLACE.

HOSE-COUPLING.

SPECIFICATION forming part of Letters Patent No. 437,213, dated September 30, 1890.

Application filed July 25, 1889. Serial No. 318,682. (No model.)

*To all whom it may concern:*

Be it known that I, BENJAMIN F. LEVET, a citizen of the United States, residing at San Diego, in the county of San Diego and State of California, have invented certain new and useful Improvements in Hose-Couplings; and I do hereby declare the following to be a full, clear, and exact description of the invention, such as will enable others skilled in the art to which it appertains to make and use the same.

This invention relates to hose-couplings; and it has for its object to provide a simple comparatively inexpensive device of few parts which is adapted to hold the ends of hose or other flexible pipe together in a rigidly-secure and water-tight manner without the use of wires or binding of any kind; and it consists of the parts and combinations of parts hereinafter described and claimed.

Figure 2:
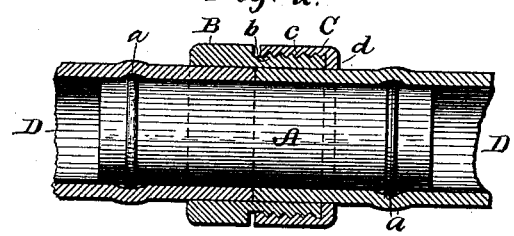
Figure 3:
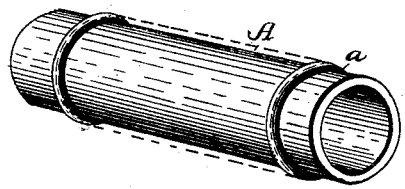
Figure 1:
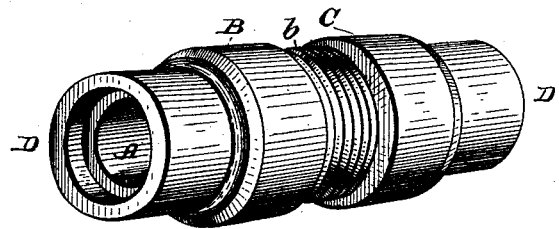

In the accompanying drawings, forming a part of this specification, Figure 1 is a perspective view showing the device in place; Fig. 2, a longitudinal vertical section through Fig. 1, and Fig. 3 a perspective view of the core.

Similar letters refer to similar parts throughout the several views.

A represents a metal tube, which forms the core for the coupling, at a short distance from each end of which a ridge or annular projection $a$ is formed in any desired manner so as to stand above the outer surface of the tube.

B represents a coupling-ring, a part of the length of which is reduced and externally screw-threaded, as at $b$, said ring being of greater diameter than the core A and adapted to readily pass over the annular projections $a$ and onto the core.

C represents a ring having internal screw-threads $c$ formed therein and a flange $d$ formed at one end thereof. This ring C is adapted to slide over the core and to screw on the reduced end of ring B, as clearly shown in Fig. 2, its flange $d$ being of the same interior diameter as the ring B.

D represents the sections or ends of the hose to be joined together or coupled.

In order to form the coupling, whether for the purpose of repairing a broken hose or to lengthen a hose by the addition of new lengths thereto, I first screw the flanged ring C onto the reduced screw-threaded end of ring B and slip the same onto the core A. I then pass the ends of the hose-sections to be coupled over the ends of the core and force the same over the annular projections $a$ until the ends of the hose-sections meet at about the center of the core under the rings B C. The rings B C are then unscrewed, thus running them back toward the ends of the core until their further progress is stopped by the projections or ridges in the hose-sections formed by the projections $a$, thus jamming the hose tightly against said annular projections from the contiguous sides of said projections and preventing their slipping off the core until the rings are screwed together or away from said projections. It will be observed that by this construction of the coupling the outward pressure of the water passing through the hose is entirely removed from the joint and exerted on the core A, thus obviating the liability of the hose bursting at this point, and making a water-tight joint. It will also be observed that the rings will be held rigidly in place against backward movement away from the hose owing to the fact that they are screwed together, thus obviating any tendency they might have to work off the ends of the hose or away from the ridges if they were not so screwed together. The rings may each be milled on their outer surfaces or formed with lugs or ridges so as to enable them to be easily turned by hand or without the use of tools.

Having thus described my invention, what I claim as new, and desire to secure by Letters Patent, is—

The combination, with the hose-sections, of the tubular core having the ridges near each end, the ring having one end reduced and externally screw-threaded, and the ring having the internal screw-threads and the flange, substantially as described.

In testimony whereof I affix my signature in presence of two witnesses.

BENJAMIN F. LEVET.

Witnesses:
E. W. MORSE,
F. W. STEWART.